United States Patent [19]

Döring et al.

[11] 4,024,034
[45] May 17, 1977

[54] METHOD FOR OPERATING THE FURNACES OF AN ELECTROLYSIS PLANT

[75] Inventors: Christfried Döring, Langensendelbach; Johann Thomas, Erlangen; Manfred Volcker, Nuremberg; Völker Sparwald, Grevenbroich; Walter Habersack, Stade, all of Germany

[73] Assignees: Siemens Aktiengesellschaft, Munich; Vereinigte Aluminium-Werke Aktiengesellschaft, Bonn, both of Germany

[22] Filed: Aug. 11, 1975

[21] Appl. No.: 605,253

Related U.S. Application Data

[62] Division of Ser. No. 491,699, July 25, 1974.

[30] Foreign Application Priority Data

July 25, 1973 Germany .......................... 2337797

[52] U.S. Cl. .............................................. 204/67
[51] Int. Cl.$^2$ ......................................... C25C 3/06
[58] Field of Search ............. 204/67, 225, 228, 245

[56] References Cited

UNITED STATES PATENTS

| 3,573,179 | 3/1971 | Dirth et al. | 204/67 |
| 3,734,841 | 5/1973 | Thomas | 204/67 |
| 3,812,024 | 5/1974 | Goodnow et al. | 204/67 |
| 3,829,365 | 8/1974 | Chaudhuri et al. | 204/67 |

*Primary Examiner*—John H. Mack
*Assistant Examiner*—Aaron Weisstuch
*Attorney, Agent, or Firm*—Kenyon & Kenyon Reilly Carr & Chapin

[57] ABSTRACT

A method and apparatus for operating an electrolysis plant including a plurality of furnaces in which the anode spacing of each furnace is controlled by means of a computer as a function of furnace resistance. A desired furnace resistance is varied as a function of the furnace current yield, the optimum of which is given by a selected number of furnace voltage variations which exceed a specified voltage level, and, in addition, as a function of furnace energy consumption as indicated by the furnace resistance gradient, the rate of change of that gradient, and the difference between the expected furnace metal production with respect to long-term current yield and the measured furnace metal production.

14 Claims, 1 Drawing Figure

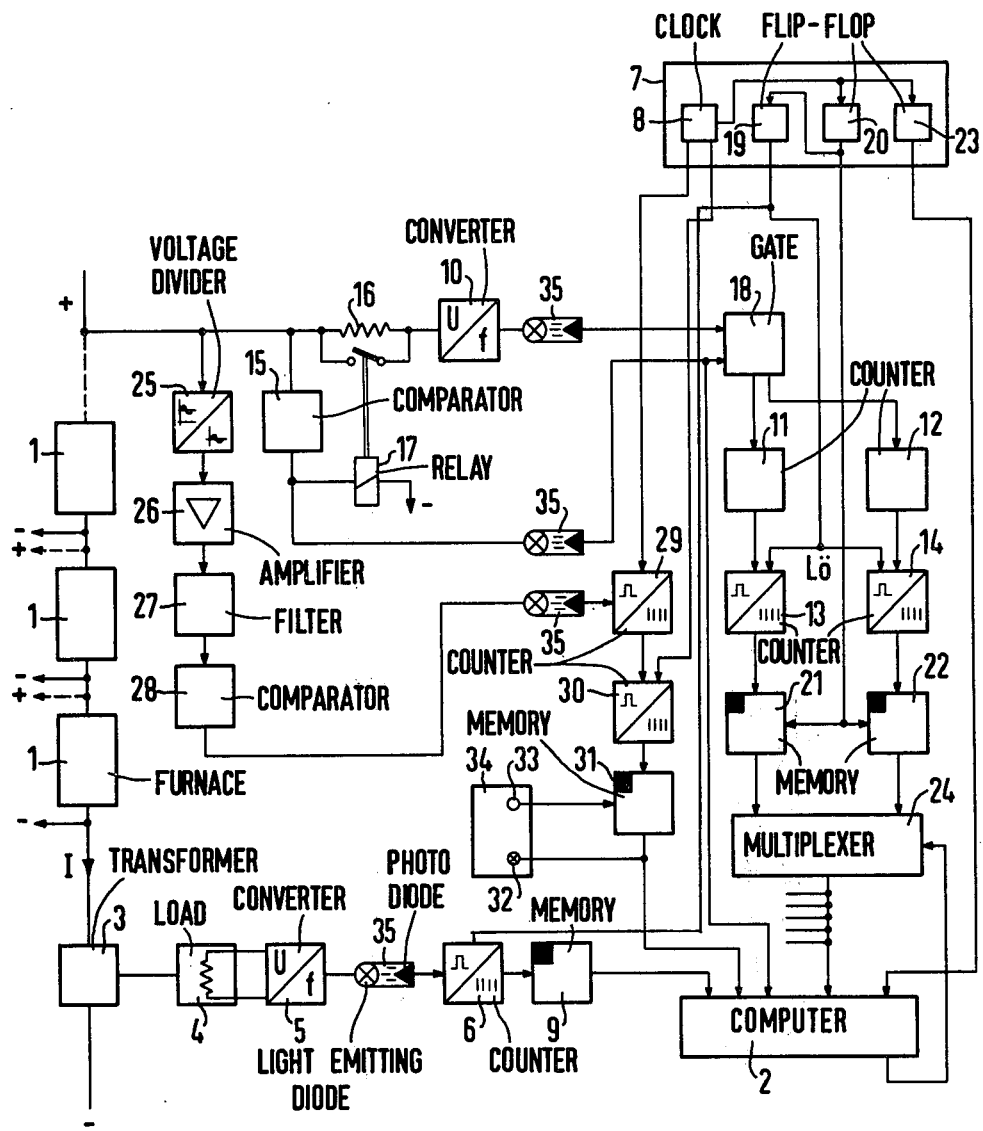

METHOD FOR OPERATING THE FURNACES OF AN ELECTROLYSIS PLANT

This is a division, of application Ser. No. 491,699 filed July 25, 1974.

BACKGROUND OF THE INVENTION

1. Field of the Invention

This invention relates to a method and apparatus for operating an electrolysis plant, specifically an aluminum electrolysis plant, in which the electrode spacing in each furnace is controlled as a function of furnace resistance, the latter being calculated by means of a computer device from the furnace current and voltage.

2. Description of the Prior Art

The specific energy consumption of an electrolysis plant is an indication of its economic efficiency, and is determined by the relationship $E_{sp} = U/k \,(Y_i)$, wherein U represents the furnace voltage, $k$ is a constant ($k=0.3354$ for an aluminum electrolysis furnace), and $Y_i$ represents the furnace current yield. The furnace current yield $Y_i$ is equal to the amount of metal produced, divided by the product of the furnace current and the constant $k$. The furnace resistance R, however, instead of furnace voltage U, may be utilized to control the furnace electrode spacing. Since the furnace voltage is equal to the sum of the polarization voltage $U_o$ and the voltage drop I.R, $U_o$ may be approximated by a constant. The furnace resistance is then given by the equation $R = (U-U_o)/I$.

The control of electrode spacing in such furnaces as a function of furnace resistance is generally known in the art. In such prior art control methods, furnace current and the electrolysis bath voltage are periodically sampled by a control system which is common to several furnaces or, alternatively, by a computer, and mean furnace resistance values are calculated therefrom. If such mean values exceed predetermined limits, the electrode spacing is adjusted accordingly by either raising or lowering the furnace anodes. Such a method is described in detail in German Offenlegungsschrift No. 1,925,201. Such methods, however, are disadvantageous in that even during normal furnace operation, the instantaneous furnace resistance may fluctuate considerably from the mean values calculated, not only due to statistical resistance variations, but also due to defective furnace operation and operating conditions, such as, for example, those which result from detached anode carbon, or from the so called "anode effect".

The above described prior art operating methods all compare the calculated mean furnace resistance values with the limits selected therefor to determine whether or not the furnace resistance is found to be within normal operating limits. The actual furnace resistance is then compared with a desired value therefor, and is adjusted accordingly by moving the furnace anodes as described above.

Another method of determining furnace resistance known in the art is to calculate the number of amplitude variations of an ac voltage which is superimposed upon the furnace voltage. Generally speaking, these variations are determined within a frequency range of from 1-20 Hz. Variations which occur within these upper and lower limits, but which exceed a specified signal level therebetween, are converted to a current which is proportional thereto. For further details regarding this method, reference may be had to German Auslegeschrift No. 1,242,884.

SUMMARY OF THE INVENTION

It is an object of the invention to provide an improved method and apparatus for operating the furnaces of an electrolysis plant wherein the furnace voltage thereof is automatically maintained at as low a level as possible within the range of optimum current yields which are attainable.

It is also an object of the invention to provide an improved method and apparatus for operating the furnaces of an electrolysis plant wherein furnace energy comsumption is maintained within economically optimum levels therefor.

These and other objects of the invention are achieved in a method and apparatus for operating an electrolysis plant which includes a plurality of furnaces, and in which the anode spacing of each furnace is controlled by a computer as a function of furnace resistance, with the latter being calculated from furnace current and voltage. The desired furnace resistance is adjusted as a function of the furnace current yield in response to a selected number of furnace voltage variations which exceed a specified voltage level, and, additionally, as a function of specific energy consumption, in response to the furnace resistance gradient, the rate of change of that gradient, and the difference between the expected furnace metal production and the measured furnace metal production. These and other features of the inventive apparatus and method are described in further detail in the following detailed description.

BRIEF DESCRIPTION OF THE DRAWING

The drawing is a schematic diagram of an improved apparatus constructed in accordance with the invention for operating the furnaces of an electrolysis plant and for carrying out the method of the same.

DETAILED DESCRIPTION

Referring now to the drawing, there is shown, in schematic form, an aluminum electrolysis plant, which may comprise more than 100 furnaces which are electrically interconnected in series relationship. For the purposes of simplicity and clarity of explanation, only three of the furnaces of such a plant are illustrated in the drawing. The operating voltage of each furnace 1 is generally approximately 4.2 volts, and the operating current thereof generally ranges between approximately 100 and 150 kA. The current output end of the series of furnaces is coupled to a dc transformer 3, a load 4, and an analog-to-digital converter 5. The converter is coupled to an electro-optical coupling device 35, which consists of a light emitting diode and a photo diode, and transmits the signals generated by converter 5 to a digital counter 6. The count of counter 6 is preferably read out every 100 seconds by means of a clock 8 which forms part of a control unit 7. The count registered in counter 6 is transmitted thereby to a memory 9 which stores the read out count. Another analog-to-digital converter 10 is coupled to the other end of the series of furnaces and converts the furnace voltage of each furnace into a plurality of signal pulses which are subsequently downcounted in counters 11 and 12 after being transmitted thereto by another electo-optical coupling device coupled to converter 10 and a gate 18. Another pair of counters 13 and 14, which are coupled to counters 11 and 12, respectively, count the output pulses of the latter during a specified time interval, for example, every 100 seconds. The furnace voltage is also transmitted to a comparator 15 which changes the scale of converter 10 by activating a relay 17 coupled thereto. The relay includes a switch coupled to a series resistor 16 connected to converter 10 and initiates the operation of counters 13 and 14 by means of gate 18. During normal furnace operating conditions, pulses corresponding to a furnace voltage of up to 7 volts are transmitted to counter 13, gate 18 and counter 11. Pulses associated with furnace voltages which are in excess of 7 volts, and which thus indicate an incipient anode effect, are transmitted through gate 18 and counter 12 to counter 14. The change in the scale of converter 10 effected by means of relay 17 and comparator 15 is detected by a computer 2 which is coupled to the input terminal of gate 18 which is coupled to comparator 15. The computer determines and indicates the number, duration and respective times of occurrence of the anode effect, and calculates the mean furnace voltage during the effect. Generally speaking, if more than 8 pulses having an amplitude greater than 7 volts are detected by the computer, the anode effect which has occurred is characterized as being unstable. In addition to a dc component, the furnace voltage signal includes a low frequency ac component which is partially characteristic of furnaces 1 and partially derived from the current supply. This ac component is smoothed and then substracted from the unsmoothed furnace voltage by means of a frequency sensitive voltage divider 25 in order to analyze the low frequency ac component thereof with respect to a frequency at which a specified voltage level is exceeded. The remaining ac component of the furnace voltage signal is amplified by an amplifier 26, and that part thereof which contains frequency components above 10 Hz is filtered out by a low-pass filter 27 which is coupled to amplifier 26. The furnace voltage amplitude peaks contained within the remaining frequency range, which extends from 1-10 Hz, and which additionally exceed a selected voltage level, for example, ±40 mV, are digitalized by a comparator 28 and then counted by a counter 29 which is coupled by another electro-optical coupling device to comparator 28. Counter 29 may be an 8-bit counter, and is periodically cleared, for example, every 5 minutes, by clock 8. If the counter counts up to its maximum count capacity during this period of time, any carry then occurring is transferred to another counter 30 coupled thereto. Counter 30 may be a 4-bit counter, and if that counter counts up to its count capacity within another selected time period, for example, 20 minutes, a memory 31 coupled thereto is set, thereby signaling the occurence of a "furnace trouble" condition. A signal lamp 32 contained within a furnace control box 34 is coupled to memory 31 and visually indicates to furnace operating personnel that such a condition has occurred. Computer 2 is also coupled to memory 31 and receives an input signal indicating the existence of a furnace trouble condition. Memory 31 is cleared, subsequent to correction of the furnace trouble condition by the furnace operating personnel, by means of a manual push-button 33 provided on control box 34 which is coupled to memory 31.

When the count capacity of counter 30 is exceeded, a reduction of the furnace current yield is indicated. The furnace resistance must then be adjusted upwardly in response to the number of pulse signals received which exceed the counter count capacity. If the count capacity continues to be exceeded even after the furnace resistance is adjusted upwardly, correction of the furnace trouble condition by the furnace operating personnel then becomes necessary. Normal operation of the furnace is re-established, for example, after removal of any pieces of carbon floating in the electrolysis bath by the operating personnel. If, however, a furnace trouble condition is not indicated over an extended period of time, for example, 48 hours, the furnace resistance may then be adjusted downwardly by the computer back to its normal operating condition setting.

Control unit 7 includes clock 8 and a plurality of flip-flops 19 and 20 which are coupled thereto. Clock 8 controls counters 6, 13 and 14 so as to transmit the counts thereof, at 100 second intervals, to memory 9, which is coupled to counter 6, and memories 21 and 22, which are coupled to counters 13 and 14. Clock 8 also causes the respective highest bit positions of each of the counters to be cleared in response to a signal from the flip-flops. The component of the furnace voltage which is not cleared from the counters, namely, the current-time integral, is carried over into the next integration period of 100 seconds duration. Simultaneously, flip-flop 23 signals computer 2 that the integration period has terminated. Computer 2 then reads out the contents of memories 9, 21 and 22 by means of multiplexer 24. The memories for all of the furnaces, and memory 9, are thus periodically interrogated every 100 seconds, and it is from these samplings, and from the polarization voltage (which is approximately 1.6 volts and is considered to be constant), that the computer calculates the furnace resistance.

The output signal pulses of converters 5 and 10 and comparators 15 and 28 are converted into light pulses by means of the light-emitting diodes of electro-optical coupling devices 35, and are transmitted in the form of electrical pulses by means of the photo diodes thereof to gate 18 and counters 6 and 29. The signals transmitted by the converters and the comparators are thus separated with respect to the potential thereof.

In operation of the electrolysis plant illustrated, the polarization voltage, which may, as previously indicated, be 1.6 volts, and the voltage level limits for controlling and evaluating the furnace operation, are first transmitted to computer 2 by means of suitable input signals. In controlling the furnace electrode spacing, a differentiation is made between those voltage level limits which depend upon the furnace current and resistance and in excess of which no electrode spacing adjustment is to be made, and those voltage level limits which depend upon furnace resistance and within which control is not to be exercised. In the following discussion, the former will be referred to as "blocking limits", and the latter will be referred to as "response limits". Such blocking limits for the current assure that control of the electrolysis plant anodes is carried out only within that portion of the current voltage characteristic thereof which is linear. The anode spacing control system is thus disabled if the furnace current deviates from a selected desired value by a predetermined increment, such as, for example, ±15%. The blocking limits which relate to furnace resistance also prevent the adjustment of the anode spacing if the furnace resistance varies by a specified increment, such as, for example, ±3%. The response limits, on the other hand, are preferably set at maximum permissible resistance difference which still effects anode spacing control. This difference may be, for example, ±1%. Besides these limits, computer 2 also received as an input an empirical value for the specific anode travel resistance. This may be, for example, ±25 microhms per mm of anode travel. Computer 2 calculates the required duration of the anode positioning command signal (which signal controls the motors which lift the furnace anodes) from the furnace resistance difference and the specific anode travel resistance. The time required between successive adjustments in the anode spacing in order to effect furnace resistance stabilization is approximately 10 minutes.

The furnace resistance gradient is determined from three consecutive resistance values which are sampled from a circulating register during normal operation. Each physical adjustment of the anode spacing by the control system clears the register, and the computer derives the slope of the resistance gradient, i.e., the change in the resistance gradient, from the difference between successive furnace resistance gradients. The resistance gradient limits and resistance gradient slope are preferably separate from each of the furnaces, and depend, among other things, on the age and bath composition of each furnace. The resistance gradient curve, and the variation of the resistance gradient with respect to time, are used to evaluate the desired resistance value. A uniform increase in both of these measured quantities indicates that the furnace operating temperature is too low, or, in other words, that the desired resistance value selected is too low. On the other hand, a small increase, or a decrease in these quantities indicates that the furnace operating temperature is too high, or, in other words, that the desired resistance value selected is too high. Computer 2 samples these deviations from normal operating conditions and corrects the desired resistance value in response to the statistical furnace voltage variations monitored. If predetermined upper limits for the resistance gradient and the resistance gradient rate of change are exceeded, the computer generates an output signal which indicates that an anode effect condition exists, and terminates movement of the furnace anodes. The furnace voltage-time curve during an anode effect and the mean furnace voltage level are important indicators for evaluation of the operating conditions of the electrolysis furnaces by the operating personnel.

In order to calculate the specific energy consumption of the furnaces over extended periods of time, the volt-hours and kiloamperes are summed for each furnace, and the amount of metal produced by the respective furnaces is measured. Monthly and annual reports for each furnace are complied from this data, and the computer calculates mean values for the current yield and specific energy consumption over the period of time required to equalize statistical variations in the metal production. Expected daily production of the metal is calculated from long-term current yield values. Computer 2 compares the expected and the actual metal production figures, and if actual production exceeds the calculated production by a specified amount, the desired resistance selected (which is too low) is then increased. If metal production is too low, the selected desired resistance is then decreased. It is thus assured that optimum metal content is maintained in the furnaces during continuous operation. Prior to initiating operation of the furnaces, an optimum long-term current yield value, based on previous metal production, is calculated separately for each furnace, and is stored in computer 2. The desired furnace resistance value is then adjusted whenever the difference between the expected and the actual metal production exceeds a predetermined amount, such as, for example, ±1000kg of aluminum. The metal content of the furnaces can also be determined over longer time intervals by utilizing radioactive isotopes. The amount of oxide introduced is then compared with the metal production in order to detect overdosage, the latter of which may cause clogging of the furnaces. Theoretically speaking, 1890 kg of oxide are consumed for each 1000 kg of aluminum produced in an aluminum electrolysis plant. Depending upon the type of oxide utilized, however, actual oxide consumption is generally higher, and ranges between 1890 and 1980 kg per 1000 kg of aluminum. The possibility of a bottom sludging ccondition in the electrolysis furnace thus should be signaled when the oxide consumption exceeds 1930 kg per 1000 kg of aluminum.

Prior to beginning operation of the electrolysis plant, each of the furnaces is preferably serviced, i.e., furnace crust is removed. The furnaces may then be coupled to computer 2 by the furnace operating personnel. Deviations from normal operating conditions disable the anode spacing control system and are visually indicated to the operating personnel by suitable signalling devices, such as the signal lamp 32 previously described herein. Such signalling devices should indicate, on the one hand, furnace resistance which is too low, thereby indicating an anode trouble condition, and, on the other hand, a furnace resistance which is too high, thereby indicating an expected anode effect. Subsequent to inspection and investigation of the furnace trouble condition indicated, recognition of the fault condition indication can be acknowledged by the furnace operating personnel by clearing memory 31 by means of button 33 on control box 34. The computer is then able to adjust the furnace resistance to the desired resistance value by adjusting the position of the furnace anodes. Furnaces 1 are preferably coupled to computer 2 continuously until an anode effect occurs, subsequent to which the furnace is reconnected to computer 2 by the operating personnel acknowledging the indication of a fault condition. If desired, computer 2 may be coupled to furnaces 1 for a limited period of time only. Reconnection of the computer to the furnaces is then effected after a subsequent servicing of the furnace. If, for example, furnaces 1 are serviced at 6 hour intervals, the control system will be coupled to the furnaces for approximately 4 hours. The desired furnace resistance setting is thus maintained in a very accurate manner, and furnace operation remains stable.

A furnace resistance increase, rather than a furnace resistance decrease, is preferred by the computer when the anode spacing is adjusted. Thus, a furnace resistance increase is effected when (1) the limit for the specific furnace voltage signals is exceeded, (2) the limit for the resistance gradient, and the rate of change of the gradient, is exceeded, and (3) the limit for the difference between the acutal and the expected metal production is exceeded. In contrast, a decrease is initiated only in the absence of all three of the above criteria over an extended period of time, for example, 48 hours. The desired value is preferably increased or decreased by the amount of the response limits.

In the foregoing specification, the invention has been described with reference to specific exemplary embodiments thereof. It will, however, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a method of operating an electrolysis plant which includes a plurality of furnaces, and in which the anode spacing of each furnace is controlled by a computer as a function of furnace resistance, said furnace resistance being calculated from furnace current and voltage, the improvement comprising selecting a desired furnace resistance and adjusting said desired resistance in response to the detection of a selected number of furnace voltage variations which exceed a specified voltage level, and, additionally, in response to the calculated furnace resistance, variations of the furnace resistance gradient, variations of the rate of change of said gradient, and the difference between the expected furnace metal production with respect to long-term current yield and the measured furnace metal production.

2. The method recited in claim 1, wherein said desired furnace resistance is adjusted only when said furnace current remains within predetermined limits selected therefor.

3. The method of claim 2, wherein said desired furnace resistance value is increased by a predetermined increment in response to said selected number of furnace voltage variations exceeding said specified voltage level, and is decreased by the same increment in the absence of said selected number of said furnace voltage variations exceeding said specified level over a predetermined period of time.

4. The method recited in claim 3, wherein each desired furnace resistance value adjustment is effected only after a predetermined time interval subsequent to a previous adjustment thereof, said interval corresponding to the time intervals between adjustments in the furnace anode spacing.

5. The method recited in claim 4, wherein the occurrence of said number of furnace voltage variations exceeding said specified level subsequent to adjustment of said furnace resistance is visually indicated.

6. The method recited in claim 5, wherein said furnace resistance is readjusted to said desired resistance value subsequent to adjustment thereof by said computer after correction of the condition causing said adjustment thereof.

7. The method recited in claim 6, wherein said furnace resistance gradient comprises the mean value of a plurality of furnace resistance mean values.

8. The method recited in claim 7, wherein said rate of change of said resistance gradient comprises the difference between a pair of consecutively determined resistance gradients.

9. The method recited in claim 8, wherein said desired furnace resistance is increased by said computer in response to an increase in the measured resistance gradient and the rate of change of said resistance gradient, and is decreased by said computer in response to a decrease of said resistance gradient below a selected lower limit therefor.

10. The method recited in claim 9, wherein adjustment of said anode spacing of said furnaces is effected only whenever said resistance gradient does not exceed an upper selected limit therefor and said rate of change of said resistance gradient does not exceed an upper limit therefor simultaneously with said resistance gradient, and wherein an impending anode effect is visually indicated by an output signal generated by said computer.

11. The method recited in claim 10, wherein said current yield is determined from continuously sliding mean values therefor within a selected period of time required for the equalization of the statistical variations of furnace metal production.

12. The method recited in claim 11, wherein said expected metal production is calculated from long term current yield values therefor.

13. The method recited in claim 12, wherein said difference etween said expected and actual metal production is continuously calculated, and wherein an output signal is generated by said computer whenever a limit selected therefor is exceeded.

14. The method recited in claim 13, wherein said desired furnace resistance is increased as a function of a positive difference, which exceeds a predetermined limit, between said actual and expected metal production, and is decreased in response to a negative difference which exceeds a predetermined limit, between said actual and expected metal production.

* * * * *